US008867892B2

(12) United States Patent
Li et al.

(10) Patent No.: US 8,867,892 B2
(45) Date of Patent: Oct. 21, 2014

(54) METHOD AND APPARATUS FOR CAMERA MOTION ANALYSIS IN VIDEO

(75) Inventors: Fei Li, Beijing (CN); Rujie Liu, Beijing (CN); Hao Yu, Beijing (CN); Takayuki Baba, Kawasaki (JP); Yusuke Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 13/355,990

(22) Filed: Jan. 23, 2012

(65) Prior Publication Data

US 2012/0249812 A1    Oct. 4, 2012

(30) Foreign Application Priority Data

Mar. 31, 2011   (CN) .......................... 2011 1 0085676

(51) Int. Cl.
*H04N 5/228* (2006.01)
*H04N 5/14* (2006.01)
*H04N 9/80* (2006.01)
*G06T 7/20* (2006.01)
*G06K 9/00* (2006.01)

(52) U.S. Cl.
CPC .............. *G06T 7/20* (2013.01); *G06K 9/00758* (2013.01)
USPC .......................... 386/241; 348/208.1; 348/699

(58) Field of Classification Search
USPC ............ 348/699, 700; 382/236, 239; 386/241
See application file for complete search history.

(56) References Cited

U.S. PATENT DOCUMENTS

| 6,449,392 B1 * | 9/2002 | Divakaran et al. ............ 382/235 |
| 6,842,197 B1 * | 1/2005 | Llach-Pinsach et al. ..... 348/700 |
| 2002/0146071 A1 * | 10/2002 | Liu et al. .................. 375/240.16 |
| 2008/0013843 A1 * | 1/2008 | Choi et al. ..................... 382/238 |
| 2009/0268097 A1 * | 10/2009 | Lin et al. ....................... 348/700 |
| 2012/0099652 A1 * | 4/2012 | Woods et al. ............ 375/240.16 |

FOREIGN PATENT DOCUMENTS

| CN | 1461142 | 12/2003 |
| CN | 1510907 A | 7/2004 |
| CN | 1938714 A | 3/2007 |
| CN | 101127866 | 2/2008 |
| CN | 101478675 A | 7/2009 |

OTHER PUBLICATIONS

Kim, Jae-Gon, "Threshold-Based Camera Motion Characterization of MPEG Video" ETRI Journal, vol. 26, No. 3, Jun. 2004, pp. 269-272.

(Continued)

*Primary Examiner* — Timothy J Henn
(74) *Attorney, Agent, or Firm* — Staas & Halsey LLP

(57) ABSTRACT

Embodiments disclose methods and apparatuses for camera motion analysis in a video, wherein one of the methods includes: analyzing, video segments with significant movement characteristics and video segments without any significant movement characteristic; for each segment without any significant movement characteristic, if a first motion type corresponding to a preceding neighboring video segment is different from a second motion type corresponding to a succeeding neighboring video segment, lowering detection criterions of the first type and the second type; judging whether the segment without any significant movement characteristic meets the lowered detection criterions; and merging the segment without any significant movement characteristic with a neighboring video segment according to the result of judgment. With the embodiments of the invention the motion type of a camera in the video can be detected more effectively and accurately, and the photographic intention of a user can be reflected more accurately.

8 Claims, 7 Drawing Sheets

(56) References Cited

OTHER PUBLICATIONS

Wu, Ping-Hao, "Detecting Duplicate Video Based on Camera Transitional Behavior" 2009 IEEE, pp. 237-240.

Delp, Edward J., "Camera Motion-Based Analysis of User Generated Video" IEEE Transactions on Multimedia, vol. 12, No. 1, Jan. 2010, pp. 28-41.

First Office Action regarding Chinese Priority Application, issued May 27, 2014.

* cited by examiner

METHOD AND APPARATUS FOR CAMERA MOTION ANALYSIS IN VIDEO

CROSS REFERENCE TO RELATED APPLICATIONS

This application claims the benefit of Chinese Application No. 201110085676.1, filed Mar. 31, 2011, the disclosure of which is incorporated herein by reference.

FIELD

The present invention generally relates to the field of processing video data and in particular to a method and apparatus for camera motion analysis in a video.

BACKGROUND

An effective video management and analysis system has been desired for people in many aspects in their daily life along with a dramatically increasing number of digital video files. With the aid of this system, people can organize video files in a personal computer more conveniently, urban traffic can be controlled effectively and video surveillance can also detect easily an abnormal event, e.g., inbreaking of a stranger, etc.

A video file is acquired from photographing by a photographer using a camera (possibly a specialized camera or a terminal device capable of photographing, e.g., a mobile phone, a portable computer, etc). Some actions of zooming, panning, etc., the camera may be performed as necessary during photographing, and these actions correspond to the motion of the camera so that different actions correspond to different types of motion. Typically a video file may include a variety of types of motion because the photographer may perform different adjustment (e.g., firstly translation, then focusing and next resting, etc.) as required during photographing.

The photographer adjusts the camera primarily in view of the extent of importance of an object of interest. For example, when the photographer puts an emphasis on photographing the action of a remote person, he or she may zoom in the camera after a lens is directed to the person to scale up the person displayed in a scene. Correspondingly, if a video file contains the type of focusing motion or the like, then the contents of the part of a video corresponding to the type of motion shall typically be of particular interest to the photographer and therefore may be important contents of the video file and even primary contents capable of representing the video file. The contents of this part can be extracted as a summary of the video file.

Therefore, effective detection of camera motion has become crucial to the video management and analysis system. Based upon the motion type of a camera during acquisition of a video, the video can be browsed more conveniently and primary contents of the video can be acquired more easily, and furthermore a summary of the video file can be acquired conveniently to serve further retrieval of the video file, etc.

The existing video management and analysis system can analyze various types of motion of a video photographing device from a video file and further acquire high-level information, e.g., photographic intention, etc. However for an analysis of the type of motion of a video photographing device from a video file in the prior art, the analysis object is a standard video file acquired from photographing and edited by a professional video photographer. Unfortunately, when the type of motion of the video photographing device is analyzed from a video file acquired from photographing by an increasing number of amateurs or an unedited video file in the method of the prior art, there frequently occurs a result of analysis which may not be sufficiently accurate or can not accurately reflect the real photographic intention of a user.

SUMMARY

In view of this, embodiments of the invention provide a method and apparatus for camera motion analysis in a video to detect more effectively and accurately the motion type of a camera in the video and also reflect more accurately the photographic intention of a user.

According to an aspect of the embodiments of the invention, there is provided a method for camera motion analysis in a video, which includes: analyzing, from the video, video segments with a significant movement characteristic and video segments without any significant movement characteristic; for each video segment without any significant movement characteristic, if a first motion type corresponding to a preceding neighboring video segment is different from a second motion type corresponding to a succeeding neighboring video segment, lowering detection criterions of the first motion type and the second motion type; judging whether the video segment without any significant movement characteristic meets the lowered detection criterions; and merging the video segment without any significant movement characteristic with a neighboring video segment according to the result of judgment.

According to another aspect of the embodiments of the invention, there is provided another method for camera motion analysis in a video, which includes: analyzing, from the video, video segments included therein and their camera motion type; finding video segments meeting a preset merging rule in the video segments of the video; and merging the found video segments and determining the type of motion of a video segment resulting from merging according to the merging rule.

According to a further aspect of the embodiments of the invention, there is provided an apparatus for camera motion analysis in a video, which includes: an analyzing unit configured to analyze, from the video, video segments with a significant movement characteristic and video segments without any significant movement characteristic; a criterion adjusting unit configured to, for each video segment without any significant movement characteristic, if a first type of motion corresponding to a preceding neighboring video segment is different from a second type of motion corresponding to a succeeding neighboring video segment, then lower detection criterions of the first type of motion and the second type of motion; a judging unit configured to judge whether the video segment without any significant movement characteristic meets the lowered detection criterions; and a merging unit configured to merge the video segment without any significant movement characteristic with a neighboring video segment according to the result of judgment.

According to a further aspect of the embodiments of the invention, there is provided another apparatus for camera motion analysis in a video, which includes: an analyzing unit configured to analyze, from the video, video segments included therein and their camera motion types; a finding unit configured to find video segments meeting a preset merging rule in the video segments of the video; and a merging unit configured to merge the found video segments and determine the type of motion of a video segment resulting from merging according to the merging rule.

Furthermore according to another aspect of the invention, there is also provided a storage medium including machine readable program codes which when executed on an information processing device cause the information processing device to perform the foregoing methods for camera motion type analysis in a video according to the invention.

Furthermore according to a further aspect of the invention, there is also provided a program product including machine executable instructions which when executed on an information processing device cause the information processing device to perform the foregoing methods for camera motion type analysis in a video according to the invention.

According to one of the foregoing methods according to the embodiment of the invention, for a video segment without any significant movement characteristic, if two preceding and succeeding neighboring video segments thereof include different types of motion, then during merging, firstly the detection criterions of the types of motion corresponding to the two preceding and succeeding neighboring video segments are lowered and then it is judged whether the video segment meets the lowered detection criterions and the video segments are merged according to the result of judgment instead of dividing the video segment without any significant movement characteristic directly at a frame at the middle into two parts which are in turn merged respectively with the preceding and succeeding neighboring video segments. Thus a video segment resulting from merging can better accommodate the real situation and also the photographic intention of a user.

According to the foregoing another method according to the embodiment of the invention, the video segments can be merged according to a preset rule in view of the correspondence relationship between the video segments and types of motion determined from analysis. This is equivalent to the case of taking into account unintentional motion introduced by some amateurish photographers during photographing, that is, equivalent to trading off between the fineness of division and the real photographic intention of the user when detecting the camera motion type in a video so that the final result of detection can better accommodate the real situation and also the photographic intention of the user.

Other aspects of the embodiments of the invention will be presented in the following detailed description serving to fully disclose preferred embodiments of the invention but not to limit the invention.

BRIEF DESCRIPTION OF DRAWINGS

The foregoing and other objects and advantages of the embodiments of the invention will be further described below in conjunction with the specific embodiments with reference to the drawings in which identical or corresponding technical features or components will be denoted with identical or corresponding reference numerals and in which.

DESCRIPTION OF EMBODIMENTS

Figure 1:
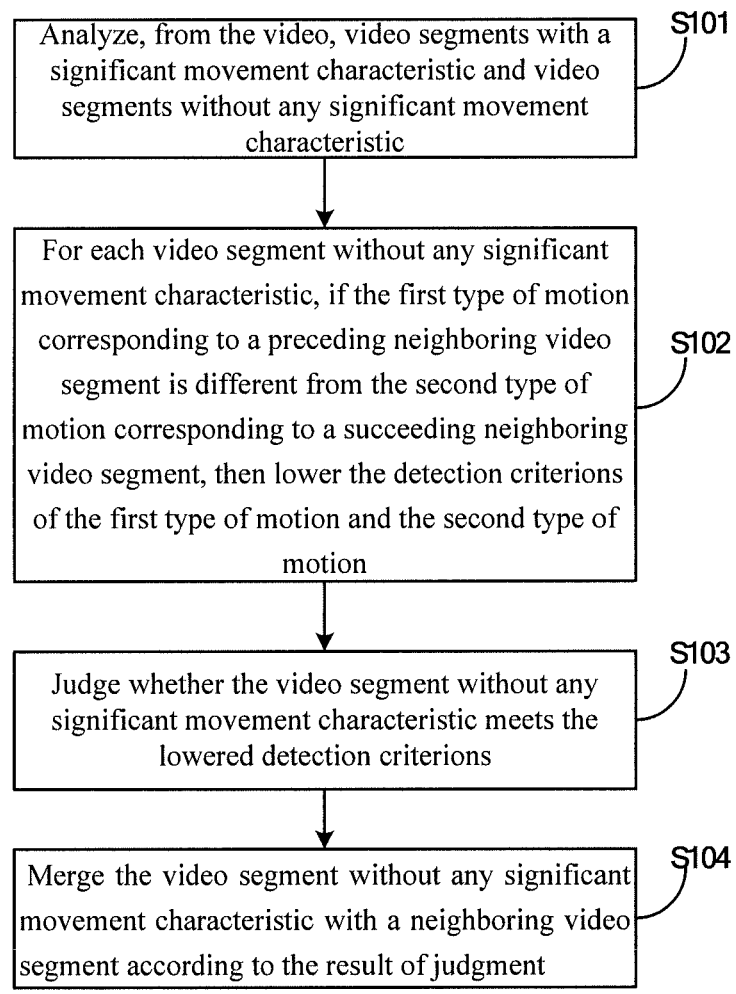
FIG. 1 is a flow chart illustrating a method according to an embodiment of the invention.

Embodiments of the invention will be described below with reference to the drawings.

The inventors have identified during implementation of the invention that analysis of the motion of a camera in a video in the method of the prior art suffers from at least the following problems:

On one hand, for detection of the motion type of a camera included in a video in the prior art, it is typical to firstly calculate camera motion parameters from an estimated motion vector, then judge from the calculated camera motion parameters whether the respective motion parameters meet detection criterions corresponding to various types of motion to thereby determine a video segment with a significant movement characteristic included in the video, then determine as a segment without any significant movement characteristic a remaining video segment if the video segment does not meet any of the judgment criterions of the various types of motion, and finally merge the video segment without any significant movement characteristic with the video segment with a significant movement characteristic, wherein the merging process is performed in the prior art typically as follows:

For a video segment without any significant movement characteristic, if the types of motion corresponding to two preceding and succeeding neighboring video segments thereof with a significant movement characteristic are identical, then it will be sufficient to directly merge this video segment without any significant movement characteristic with the two preceding and succeeding neighboring video segments thereof. For example, both the types of motion of the two preceding and succeeding neighboring video segments thereof are focusing, then it will be apparently sufficient to directly merge this video segment with the two preceding and succeeding neighboring video segments thereof with a significant movement characteristic and determine the camera motion type corresponding to a video segment resulting from merging as focusing.

And if the types of motion corresponding to the two preceding and succeeding neighboring video segments thereof with a significant movement characteristic are different, then the video segment without any significant movement characteristic will be divided at a frame at the middle into two parts, where the first half part is merged with the preceding neighboring video segment and the second half part is merged with the succeeding neighboring video segment. For example, a video is composed of 50 frames, and as apparent from analysis thereof, the camera motion type of a video segment composed of the $1^{st}$ frame to the $20^{th}$ frame is focusing, the camera motion type of a video segment composed of the $30^{th}$ frame to the $50^{th}$ frame is translation, and a video segment composed of the $21^{st}$ frame to the $29^{th}$ frame has no significant movement characteristic, that is, the video segment does not meet any condition of various types of motion. In the prior art, at this time, the $21^{st}$ to $25^{th}$ frames can be merged with a preceding neighboring video segment, that is, the $1^{st}$ frame to the $25^{th}$ frame compose a video segment, and the camera motion type corresponding to the video segment is determined as focusing; and the $26^{th}$ to $29^{th}$ frames can be merged with a succeeding neighboring video segment, that is, the $26^{th}$ frame to the $50^{th}$ frame compose a video segment, and the camera motion type corresponding to the video segment is determined as translation.

However this may not necessarily be the real situation. For example there is such a real situation in the foregoing example that an amateurish video photographer intends to firstly focus upon an object and track the motion of the object (that is, perform firstly a focusing operation and then a translation operation) to acquire a video. However the photographer is not very familiar with a zooming operation and can not zoom as desired accurately and rapidly but instead may do this possibly by firstly performing rapid focusing, then slowing the zooming speed when he or she feels it is almost appropriate and then performing translating to track motion of the object so that a movement characteristic of focusing has become very insignificant in the corresponding video segment (possibly the $21^{st}$ to $29^{th}$ frames in the foregoing example) in the acquired video and no other motion, e.g., translation, rotation, etc., occurs in this period of time and consequently the video segment has to be determined as a video segment without any significant movement characteristic in the existing method. However actually this video segment shall preferentially be merged with a preceding video segment, that is, identifying of the camera video type corresponding to the video segment composed of the $1^{st}$ frame to the $29^{th}$ frame as focusing will better accommodate the real situation and the photographic intention of the user. However it is apparent that this is out of the reach of the method in the prior art.

Therefore an embodiment of the invention firstly provides a corresponding solution to this problem. Specifically referring to FIG. 1, a method for camera motion analysis in a video according to the embodiment of the invention includes:

S101: video segments with a significant movement characteristic and video segments without any significant movement characteristic are analyzed from the video by an analyzing unit.

For a video, a plurality of rounds of detection will typically be performed to analyze the motion type of a camera so that one type of motion is detected in each round. Specifically the following steps are typically performed: firstly it is judged for a first type of motion whether there are frames meeting a criterion of the type of motion among the respective frames of the video, and if so, then a video segment corresponding to these frames is determined as this type of motion; and then it is judged whether the remaining frames, i.e., frames which are not of the first type of motion, meet a judgment criterion of a second type of motion, and so on. Finally the following result will arise after detection goes through respective possible types of motion: some video segments have been tagged with corresponding types of motion and will be referred collectively to as a segment with a significant movement characteristic. There are also such some segments composed of frames that they do not meet any of the judgment criterions of the various types of motion and consequently are determined as a segment without any significant movement characteristic. Then the segments without any significant movement characteristic are merged with the segments with a significant movement characteristic.

For example, a video is composed of 50 frames, and there are assumed three types of motion: zooming, rotation and translation for which detection is performed in that order. Firstly the motion type of zooming is detected in the respective 50 frames, and assumed a characteristic of zooming is detected in the $1^{st}$ to $15^{th}$ frames, and then the $1^{st}$ to $15^{th}$ frames compose a video segment, and the camera motion type corresponding to the video segment is zooming.

Next the motion type of rotation is detected in the remaining $16^{th}$ to $50^{th}$ frames, and assumed a characteristic of rotation is detected in the $25^{th}$ to $40^{th}$ frames, and then the $25^{th}$ to $40^{th}$ frames compose a video segment, and the camera motion type corresponding to the video segment is rotation.

Finally the motion type of translation is detected in the remaining $16^{th}$ to $24^{th}$ frames and the $41^{st}$ to $50^{th}$ frames, and assumed a characteristic of translation is detected in the $41^{st}$ to $50^{th}$ frames, and then the $41^{st}$ to $50^{th}$ frames can compose a video segment, and the camera motion type corresponding to the video segment is translation.

Apparently the $16^{th}$ to $24^{th}$ frames do not meet any of the foregoing three types of motion and therefore are determined as a video segment without any significant movement characteristic.

Particularly the video segments of the various types of motion can be detected as follows.

Firstly each frame of the video can be divided into a number of image blocks and a motion vector of each image block can be determined through local searching. Then global motion of a field of motion vectors can be described in the following affine model including 6 parameters:

$$\begin{cases} u = a_1 + a_2 x + a_3 y \\ v = a_4 + a_5 x + a_6 y \end{cases} \quad (1)$$

Wherein (x, y) represents the position of an image block and is known, and (u, v) represents a motion vector of the image block. The 6 parameters in the foregoing model can be determined from the positions of a plurality of image blocks in the same frame and their corresponding motion vector information in a least square method, etc. Then camera motion parameters can be calculated according to a correspondence relationship between the camera motion parameters and the 6 parameters in the foregoing model.

Particularly the correspondence relationship between the camera motion parameters and the parameters in the foregoing model is as follows:

$$\begin{cases} \text{pan} = a_1 \\ \text{tilt} = a_4 \\ \text{div} = 0.5(a_2 + a_6) \\ \text{rot} = 0.5(a_5 - a_3) \\ \text{static} = |a_1| + |a_2| + |a_3| + |a_4| + |a_5| + |a_6| \end{cases} \quad (2)$$

In the foregoing equation (2), pan represents a motion parameter corresponding to horizontal movement of the camera, tilt represents a motion parameter corresponding to vertical movement of the camera, div represents a motion parameter corresponding to zooming of the camera, rot represents a motion parameter corresponding to rotation of the camera, and static represents a motion parameter corresponding to the stationary camera.

When it is judged whether a specific frame of image includes a characteristic of a specific type of motion, the calculated motion parameter of the type of motion of the frame (of course, the motion parameters of a frame of image can be represented as motion parameters between the frame and a neighboring frame, for example, motion parameters between the $1^{st}$ frame and the $2^{nd}$ frame represent motion parameters of the $1^{st}$ frame, motion parameters between the $2^{nd}$ frame and the $3^{rd}$ frame represent motion parameters of the $2^{nd}$ frame, and so on; or otherwise. This does not relate to an innovative point of the embodiment of the invention and therefore will not be described so as to avoid repetition) can be compared with a criterion threshold preset for the type of motion, and if a detection condition is met, then the frame is of the type of motion; otherwise, the frame is not of the type of motion.

S102: For each video segment without any significant movement characteristic, if the first type of motion corresponding to a preceding neighboring video segment is different from the second type of motion corresponding to a succeeding neighboring video segment, then the detection criterions of the first type of motion and the second type of motion are lowered by a criterion adjusting unit.

Apparently both preceding and succeeding neighboring video segments of a video segment without any significant movement characteristic include a significant movement characteristic. And in the case that the preceding and succeeding neighboring video segments include the same type of motion, it can be sufficient to merge the video segment directly with the two preceding and succeeding neighboring video segments as in the prior art.

In the case that the two preceding and succeeding neighboring video segments include different types of motion, assumed the preceding neighboring video segment includes the first type of motion and the succeeding neighboring video segment includes the second type of motion, then the embodiment of the invention provides such a novel merging method that firstly the detection criterions of the first type of motion and the second type of motion are lowered. For example, an original criterion threshold of the first type of motion is A and the detection criterion thereof is that the first type of motion can be determined only if the motion parameter of the type of motion is above A; and alike, assumed an original criterion threshold of the second type of motion is B and the detection criterion thereof is that the second type of motion can be determined only if the motion parameter of the type of motion is above B. Then lowering of the detection criterions is equivalent to lowering of the threshold corresponding to the first type of motion to a and that corresponding to the second type of motion to b, and thus the video segment without any significant movement characteristic can be determined as meeting the lowered detection criterion of the first type of motion only if the motion parameter of the first type of motion is above a and as meeting the lowered detection criterion of the second type of motion only if the motion parameter of the second type of motion is above b.

S103: It is judged whether the video segment without any significant movement characteristic meets the lowered detection criterions by a judging unit.

Specifically it is equivalently judged whether the motion parameters of the first type of motion of the respective frames in the video segment without any significant movement characteristic are above a, and if all or the majority thereof are above a, then the video segment without any significant movement characteristic can be determined as meeting the lowered detection criterion of the first type of motion; otherwise, the former can be determined as not meeting the latter. Alike it is judged whether the motion parameters of the second type of motion of the respective frames in the video segment without any significant movement characteristic are above b, and if all or the majority thereof are above b, then the video segment without any significant movement characteristic can be determined as meeting the lowered detection criterion of the second type of motion; otherwise, the former can be determined as not meeting the latter.

S104: The video segment without any significant movement characteristic is merged with a neighboring video segment according to the result of judgment by a merging unit.

The result of judgment in the step S103 can be used as a reference for merging the video segments. Specifically there may be a variety of scenarios in one of which assumed the video segment without any significant movement characteristic meets the lowered detection criterion of only one type of motion, then the video segment without any significant movement characteristic can be merged with a neighboring video segment corresponding to the type of motion. For example, if the video segment without any significant movement characteristic meets the lowered detection criterion of only the first type of motion, then the video segment without any significant movement characteristic can be merged with a preceding neighboring video segment. If the video segment without any significant movement characteristic meets the lowered detection criterion of only the second type of motion, then the video segment without any significant movement characteristic can be merged with a succeeding neighboring video segment.

Alternatively in another case, assumed the video segment without any significant movement characteristic meets the lowered detection criterions of both the first and second types of motion, then the video segment without any significant movement characteristic can be merged with a neighboring video segment according to extent of meeting. That is, if the video segment without any significant movement characteristic meets both the lowered detection criterion of the first type of motion and that of the second type of motion, then they may be met to different extents. For example, the motion parameters of the first type of motion of 95% of the frames are above the lowered criterion threshold of the first type of motion, and the motion parameters of the second type of motion of 80% of the frames are above the lowered criterion threshold of the second type of motion, and then although both the detection criterions of the first and second types of motion are met, the first type of motion is met to a larger extent than the second type of motion, and therefore the video segment without any significant movement characteristic can be merged with the preceding neighboring video segment. Of course, if the lowered detection criterions of the first and second types of motion are met to an identical or equivalent extent, then a method similar to the prior art can be adopted, that is, the video segment without any significant movement characteristic is divided into two parts so that the first half part is merged with the preceding neighboring video segment and the second half part is merged with the succeeding neighboring video segment.

Furthermore there may be such a scenario that the video segment without any significant movement characteristic meets neither of the lowered detection criterions of the first and second types of motion, and at this time, a method similar to the prior art can also be adopted, that is, the video segment without any significant movement characteristic is divided into two parts so that the first half part is merged with the preceding neighboring video segment and the second half part is merged with the succeeding neighboring video segment. Specifically the video segment can be divided at a frame at the middle or at another frame. For example, it can be divided at the one-third point so that the first one-third part can be determined as the first half part and the remaining two-third part can be determined as the second half part, and so on.

Specially in the foregoing example, a video segment composed of the $16^{th}$ to $24^{th}$ frames is detected as a video segment without any significant movement characteristic, and then a preceding neighboring video segment thereof is a video segment composed of the $1^{st}$ to $15^{th}$ frames and the corresponding first type of motion thereof is zooming, and a succeeding neighboring video segment thereof is a video segment composed of the $25^{th}$ to $40^{th}$ frames and the corresponding second type of motion thereof is rotation. Therefore when the video segment without any significant movement characteristic is merged, firstly the criterion thresholds of zooming and rotation can be lowered, and then it can be judged whether the parameters of zooming motion of the $16^{th}$ to $24^{th}$ frames are above the lowered criterion threshold of zooming, and if so, then they meet the lowered criterion of zooming; and at the same time, it can also be judged whether the parameters of rotation motion of the $16^{th}$ to $24^{th}$ frames are above the lowered criterion threshold of rotation, and if so, then they meet the lowered criterion of rotation.

Particularly during merging, if the video segment composed of the $16^{th}$ to $24^{th}$ frames meets only the lowered detection criterion of zooming, then the video segment composed of the $16^{th}$ to $24^{th}$ frames can be merged with the video segment composed of the $1^{st}$ to $15^{th}$ frames, that is, the $1^{st}$ to $24^{th}$ frames compose a video segment, and the type of motion corresponding to the video segment resulting from merging is zooming. Alike, if the video segment composed of the $16^{th}$ to $24^{th}$ frames meets only the lowered detection criterion of rotation, then the video segment composed of the $16^{th}$ to $24^{th}$ frames can be merged with the video segment composed of the $25^{th}$ to $40^{th}$ frames, that is, the $16^{th}$ to $40^{th}$ frames compose a video segment, and the type of motion corresponding to the video segment resulting from merging is rotation.

If the video segment composed of the $16^{th}$ to $24^{th}$ frames meets both the lowered detection criterion of zooming and the lowered detection criterion of rotation, then the extents to which the two criterions are met can be determined. For example, if the motion parameters of zooming of all the 9 frames are above the lowered detection criterion of zooming and the motion parameters of rotation of only 7 frames are above the lowered detection criterion of rotation, then it indicates that the lowered detection criterion of zooming is met to a larger extent, and therefore the video segment composed of the $16^{th}$ to $24^{th}$ frames can be merged with the video segment composed of the $1^{st}$ to $15^{th}$ frames, that is, the $1^{st}$ to $24^{th}$ frames compose a video segment, and the type of motion corresponding to the video segment resulting from merging is zooming. On the contrary, if the motion parameters of zooming of 7 frames are above the lowered detection criterion of zooming and the motion parameters of rotation of all the 9 frames are above the lowered detection criterion of rotation, then it indicates that the lowered detection criterion of rotation is met to a larger extent, and therefore the video segment composed of the $16^{th}$ to $24^{th}$ frames can be merged with the video segment composed of the $25^{th}$ to $40^{th}$ frames, that is, the $16^{th}$ to $40^{th}$ frames compose a video segment, and the type of motion corresponding to the video segment resulting from merging is rotation.

If the video segment composed of the $16^{th}$ to $24^{th}$ frames meets neither the lowered detection criterion of zooming nor the lowered detection criterion of rotation, then the video segment can be divided into two parts so that the first half part is merged with the preceding neighboring video segment and the second half part is merged with the succeeding neighboring video segment. For example, the $16^{th}$ to $19^{th}$ frames are merged with the video segment composed of the $1^{st}$ to $15^{th}$ frames, that is, the $1^{st}$ to $19^{th}$ frames compose a video segment, and the type of motion corresponding to the video segment resulting from merging is zooming. Also the $20^{th}$ to $24^{th}$ frames are merged with the $25^{th}$ to $40^{th}$ frames, that is, the $20^{th}$ to $40^{th}$ frames compose a video segment, and the type of motion corresponding to the video segment resulting from merging is rotation.

Of course, a variety of specific merging methods can also be possible and will not be enumerated here.

In summary, in the foregoing method according to the embodiment of the invention, for a video segment without any significant movement characteristic, if two preceding and succeeding neighboring video segments thereof include different types of motion, then during merging, firstly the detection criterions of the types of motion corresponding to the two preceding and succeeding neighboring video segments are lowered and then it is judged whether the video segment meets the lowered detection criterions and the video segments are merged according to the result of judgment instead of dividing the video segment without any significant movement characteristic directly at a frame at the middle into two parts which are in turn merged respectively with the preceding and succeeding neighboring video segments. Thus a video segment resulting from merging can better accommodate the real situation and also the photographic intention of a user.

The problem of an aspect in the prior art and the corresponding solution have been described in details above. While addressing the problem, the inventors have also identified a problem of another aspect in the prior art:

In the method for camera motion analysis in the prior art, since an analysis object is typically a standard video acquired from photographing by a professional video photographer and having been processed, the analysis principle thereof is to subdivide the video into video segments as finely as possible and to determine their corresponding types of motion. However the following problem has not been taken into account in the prior art: a video acquired through photographing by some amateurish photographers may be subject to some unintentional camera motion due to a limited level of the photographers or another reason. In this case, a video segment corresponding to such unintentional camera motion will also be identified separately in the detection method of the prior art, that is, such unintentional camera motion can not be identified in the prior art. However this apparently may not accommodate well the photographic intention of the user.

Figure 2:
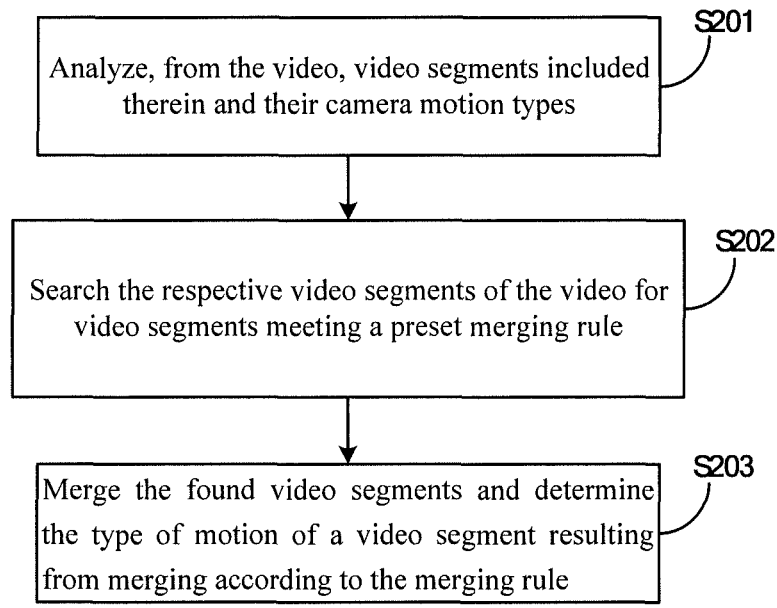
FIG. 2 is a flow chart illustrating another method according to an embodiment of the invention.

In view of the foregoing problem, an embodiment of the invention also provides a corresponding solution, and particularly referring to FIG. 2, the embodiment of the invention provides another method for camera motion analysis in a video, which includes:

S201: Video segments included in the video and their camera motion types are analyzed from the video by an analyzing unit.

Video segments included in the video and the corresponding camera motion types thereof can be analyzed particularly in the method described above, and a repeated description thereof will be omitted here. It shall be noted that the video segment as described in this step refers to a video segment resulting from merging a video segment without any significant movement characteristic with a video segment with a significant movement characteristic, that is, the corresponding camera motion types of the respective video segments have been determined preliminarily.

S202: The respective video segments of the video are searched for video segments meeting a preset merging rule by a finding unit.

A certain merging rule can be preset empirically, and then it can be judged whether there are video segments meeting the merging rule after the respective video segments and their corresponding camera motion types have been determined preliminarily.

S203: The found video segments are merged and the type of motion of a video segment resulting from merging is determined according to the merging rule by a merging unit.

The following information can be set in the merging rule: a specific characteristic of a video that can be merged and the camera motion type corresponding to the video segment resulting from merging. Therefore it will be sufficient to merge the video segments and determine the type of motion corresponding to the video segment resulting from merging according to the merging rule.

Particularly the merging rule can be set in view of a neighborhood relationship, the types of motion, durations, etc., of the video segments, and therefore the respective video segments of the video can be searched for the video segments meeting the preset merging rule according to the neighborhood relationship, the types of motion, durations, etc., of the video segments.

Specifically several typical ones of various possible scenarios will be introduced below.

In one of the scenarios, the video segments to be merged will be searched for under the following condition: for a first video segment, a second video segment and a third video segment which are sequentially neighboring in time, if the types of motion of both the first video segment and the third video segment are zooming and the type of motion of the second video segment is stillness or translation lasting for a shorter duration than a preset threshold, that is, there is a stationary or translational segment lasting for a short duration between two segments of zooming, then it indicates that the primary intention of a user shall be zooming, but since the first operation is performed for an insufficient period of time, the operation proceeds after a pause, or since the user is unsatisfied with the position of a focus point on the halfway, the operation proceeds after adjusting through translation following the first operation. Therefore stillness or translation between the first video segment and the second video segment shall belong to unintentional camera motion, so the first video segment, the second video segment and the third video segment can be merged, and the type of motion of a video segment resulting from merging can be determined as zooming. That is, the three segments meeting the foregoing condition can be merged into a segment of zooming.

In another scenario, the video segments to be merged will be searched for under the following condition: for a first video segment, a second video segment and a third video segment which are sequentially neighboring in time, if the type of motion of the first video segment is zooming, the type of motion of the second video segment is translation lasting for a shorter duration than a first preset threshold, and the type of motion of the third video segment is stillness lasting for a longer duration than a second preset threshold, where the first preset threshold and the second preset threshold may be identical or different, that is, there is a short translational segment between the segment of zooming and the long stationary segment, then it indicates that the primary intention of the user shall be to zoom in on and then photograph at rest a certain scene of interest and the translation operation is merely adjustment performed by the user when he or she is unsatisfied with the position of a focus point. Therefore the second video segment and the third video segment can be merged and the type of motion of a video segment resulting from merging can be determined as stillness. That is, the translational segment and the stationary segment meeting the foregoing condition can be merged into a stationary segment.

In still another scenario, the video segments to be merged can be searched for under the following condition: for a first video segment, a second video segment and a third video segment which are sequentially neighboring in time, if the type of motion of the first video segment is zooming, the type of motion of the second video segment is stillness lasting for a shorter duration than a first preset threshold, and the type of motion of the third video segment is translation lasting for a longer duration than a second preset threshold, where the first preset threshold and the second preset threshold may be identical or different, that is, there is a short stationary segment between the segment of zooming and the long translational segment, then it indicates that the primary intention of the user shall be to zoom in on and then photograph with translation a certain scene of interest and the segment of a stationary scene occurs due to an unskilled operation of the user or another reason. Therefore the second video segment and the third video segment can be merged and the camera motion type of a video segment resulting from merging can be determined as translation. That is, the stationary segment and the translational segment meeting the foregoing condition can be merged into a translational segment.

In a further scenario, the video segments to be merged will be searched for under the following condition: also for a first video segment, a second video segment and a third video segment which are sequentially neighboring in time, if the type of motion of the first video segment is zooming, the type of motion of the second video segment is translation toward a first direction lasting for a shorter duration than a first preset threshold, and the type of motion of the third video segment is translation toward a second direction lasting for a longer duration than a second preset threshold, where the first preset threshold and the second preset threshold may be identical or different and the first direction is different from the second direction, that is, there is a short segment translated toward another direction between the segment of zooming and the long translational segment, then it indicates that the primary intention of the user shall be to zoom in on and then photograph with translation a certain scene of interest and translation toward the other direction occurs due to a wrong operation of the user or another reason. Therefore the second video segment and the third video segment can be merged and the motion type of a video segment resulting from merging can be determined as translation toward the second direction. That is, the translational segments in the two different directions can be merged into a translation segment in such a direction that depends upon translational motion lasting for a longer period of time.

Of course, other merging rules than the foregoing merging rules can also be set as required in practice, and for example, it may also be appropriate to merge a segment of rotation instead of a segment of zooming in the foregoing respective scenarios. In summary, merging may be possible so long as there is an action of possible transition between two video segments, and different scenarios will not be enumerated here.

It shall be noted that the time thresholds mentioned in the embodiment of the invention can be derived empirically or set as required and will not be limited here.

In summary, with the foregoing second method for camera motion analysis in a video according to the embodiment of the invention, the video segments can be merged according to a preset merging rule in view of the correspondence relationship between the video segments and types of motion determined from preliminary analysis. This is equivalent to the case of taking into account unintentional motion introduced by some amateurish photographers during photographing, that is, equivalent to trading off between the fineness of division and the real photographic intention of the user for detecting the camera motion type in a video so that the final result of detection can better accommodate the real situation and also the photographic intention of the user to thereby improve the effectiveness of analyzing the motion of a camera.

Figure 3:
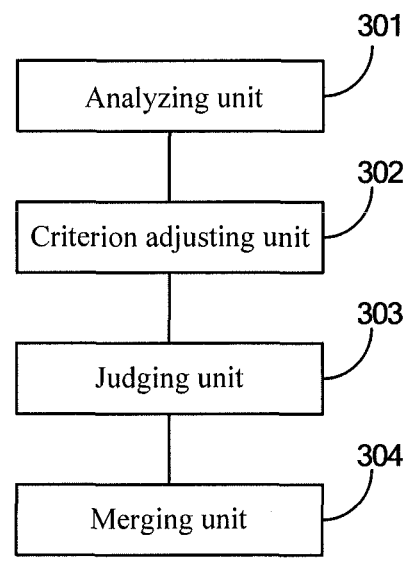
FIG. 3 is a schematic diagram illustrating a first apparatus according to an embodiment of the invention.

In correspondence to the first method for camera motion analysis in a video according to the embodiment of the invention, an embodiment of the invention further provides an apparatus for camera motion analysis in a video, and referring to FIG. 3, the apparatus includes: an analyzing unit 301 configured to analyze, from the video, video segments with a significant movement characteristic and video segments without any significant movement characteristic; a criterion adjusting unit 302 configured to, for each video segment without any significant movement characteristic, if a first type of motion corresponding to a preceding neighboring video segment is different from a second type of motion corresponding to a succeeding neighboring video segment, then lower detection criterions of the first type of motion and the second type of motion; a judging unit 303 configured to judge whether the video segment without any significant movement characteristic meets the lowered detection criterions; and a merging unit 304 configured to merge the video segment without any significant movement characteristic with a neighboring video segment according to the result of judgment.

Figure 4:
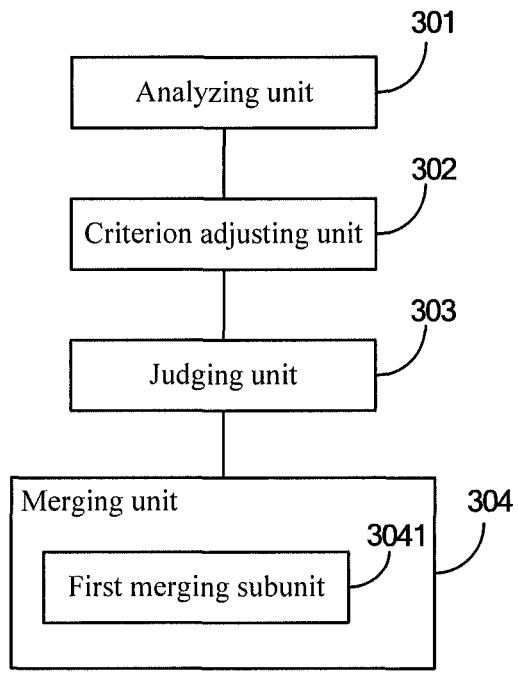
FIG. 4 is a schematic diagram illustrating a second apparatus according to an embodiment of the invention.

Particularly there may be a variety of scenarios for merging, for example:

In a first scenario, referring to FIG. 4, the merging unit 304 can include: a first merging subunit 3041 configured to, if the video segment without any significant movement characteristic meets only the lowered detection criterion of only one type of motion, then merge the video segment without any significant movement characteristic with the neighboring video segment corresponding to the type of motion.

Figure 5:
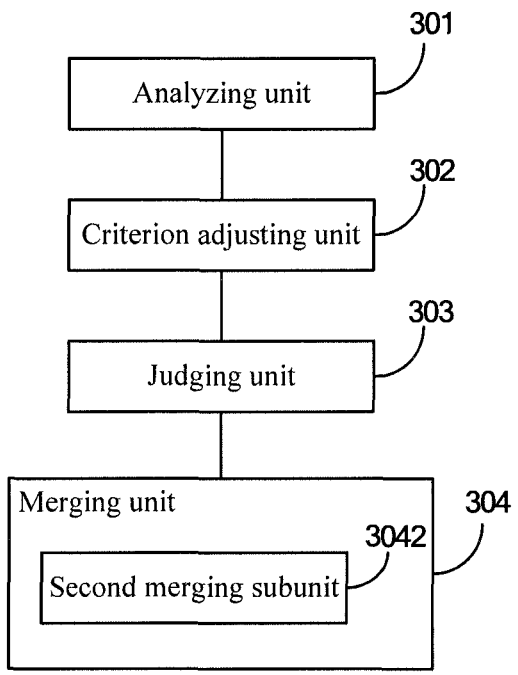
FIG. 5 is a schematic diagram illustrating a third apparatus according to an embodiment of the invention.

In another scenario, referring to FIG. 5, the merging unit 304 can include: a second merging subunit 3042 configured to, if the video segment without any significant movement characteristic meets the lowered detection criterions of both the first and second types of motion, then merge the video segment without any significant movement characteristic with one of the neighboring video segments according to the extents to which they are met.

Figure 6:
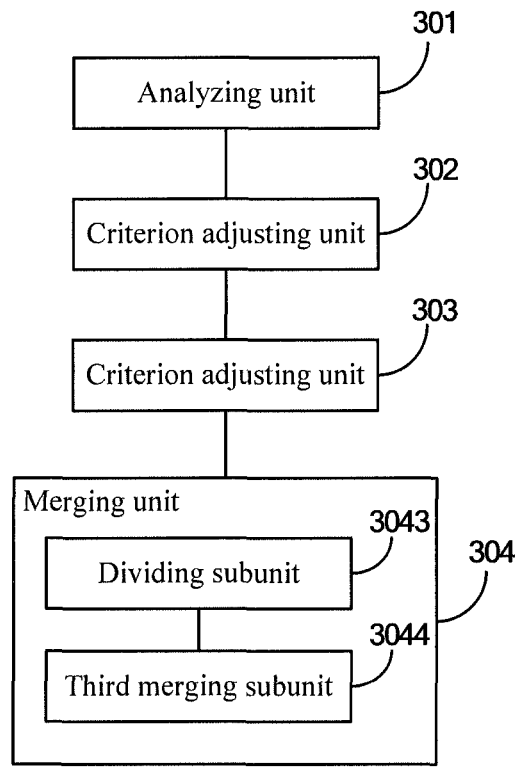
FIG. 6 is a schematic diagram illustrating a fourth apparatus according to an embodiment of the invention.

In a further scenario, referring to FIG. 6, the merging unit 304 can include: a dividing subunit 3043 configured to, if the video segment without any significant movement characteristic meets neither of the lowered detection criterions of the first and second types of motion, then divide the video segment without any significant movement characteristic into two parts; and a third merging subunit 3044 configured to merge the first half part with the preceding neighboring video segment and the second half part with the succeeding neighboring video segment.

With the foregoing apparatus according to the embodiment of the invention, for a video segment without any significant movement characteristic, if two preceding and succeeding neighboring video segments thereof include different types of motion, then during merging, firstly the detection criterions of the types of motion corresponding to the two preceding and succeeding neighboring video segments are lowered and then it is judged whether the video segment meets the lowered detection criterions and the video segments are merged according to the result of judgment instead of dividing the video segment without any significant movement characteristic directly at a frame at the middle into two parts which are in turn merged respectively with the preceding and succeeding neighboring video segments. Thus a video segment resulting from merging can better accommodate the real situation and also the photographic intention of a user.

Figure 7:
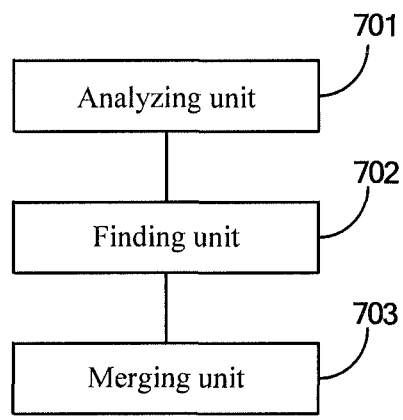
FIG. 7 is a schematic diagram illustrating a fifth apparatus according to an embodiment of the invention.

In correspondence to the second method for camera motion analysis in a video according to the embodiment of the invention, an embodiment of the invention further provides another apparatus for camera motion analysis in a video, and referring to FIG. 7, the apparatus includes: an analyzing unit 701 configured to analyze, from the video, video segments included therein and their camera motion types; a finding unit 702 configured to find video segments meeting a preset merging rule in the video segments of the video; and a merging unit 703 configured to merge the found video segments and determine the type of motion of a video segment resulting from merging according to the merging rule.

In a specific implementation, the finding unit 702 can particularly be configured to find the video segments meeting the preset merging rule according to a neighborhood relationship, the types of motion and durations of the video segments.

Figure 8:
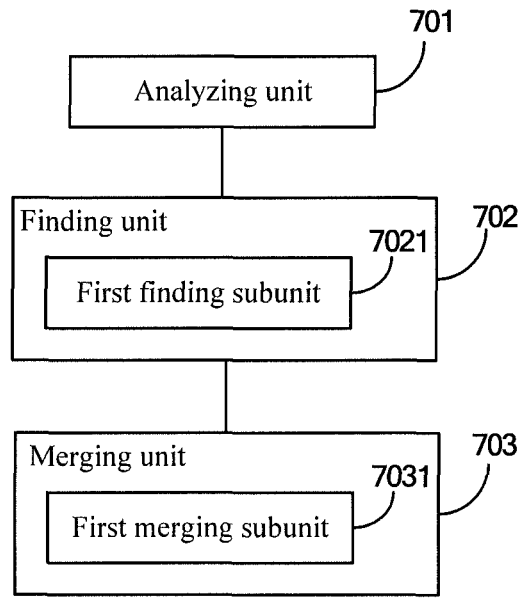
FIG. 8 is a schematic diagram illustrating a sixth apparatus according to an embodiment of the invention.

Particularly referring to FIG. 8, the finding unit 702 can include: a first finding subunit 7021 configured to find the video segments to be merged under the following condition: for a first video segment, a second video segment and a third video segment which are sequentially neighboring in time, if the types of motion of both the first video segment and the third video segment are zooming and the type of motion of the second video segment is stillness or translation lasting for a shorter duration than a preset threshold, then the first video segment, the second video segment and the third video segment meet the preset merging rule.

Correspondingly the merging unit 703 can include: a first merging subunit 7031 configured to merge the first video segment, the second video segment and the third video segment and to determine the type of motion of the video segment resulting from merging as zooming.

Figure 9:
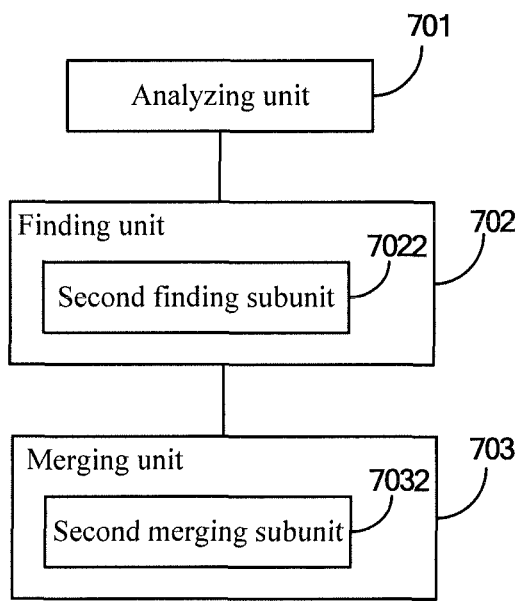
FIG. 9 is a schematic diagram illustrating a seventh apparatus according to an embodiment of the invention.

Or referring to FIG. 9, the finding unit 702 can alternatively include: a second finding subunit 7022 configured to find the video segments to be merged under the following condition: for a first video segment, a second video segment and a third video segment which are sequentially neighboring in time, if the type of motion of the first video segment is zooming, the type of motion of the second video segment is translation lasting for a shorter duration than a first preset threshold, and the type of motion of the third video segment is stillness lasting for a longer duration than a second preset threshold, then the second video segment and the third video segment meet the preset merging rule.

Correspondingly the merging unit 703 can include: a second merging subunit 7032 configured to merge the second video segment and the third video segment and to determine the type of motion of the video segment resulting from merging as stillness.

Figure 10:
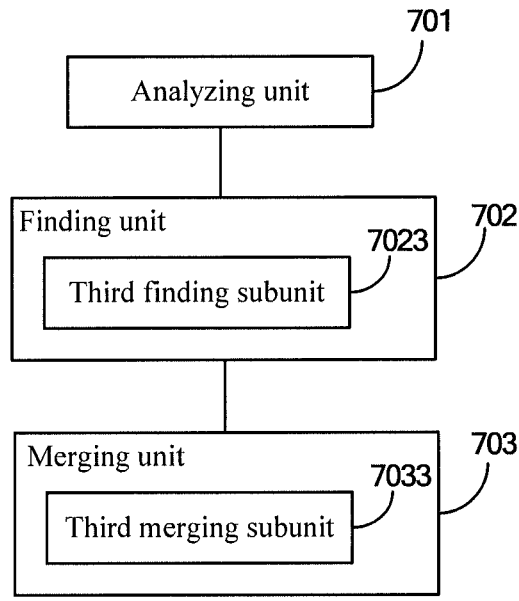
FIG. 10 is a schematic diagram illustrating an eighth apparatus according to an embodiment of the invention.

Further referring to FIG. 10, the finding unit 702 can alternatively include: a third finding subunit 7023 configured to find the video segments to be merged under the following condition: for a first video segment, a second video segment and a third video segment which are sequentially neighboring in time, if the type of motion of the first video segment is zooming, the type of motion of the second video segment is stillness lasting for a shorter duration than a first preset threshold, and the type of motion of the third video segment is translation lasting for a longer duration than a second preset threshold, then the second video segment and the third video segment meet the preset merging rule.

Correspondingly the merging unit 703 can include: a third merging subunit 7033 configured to merge the second video segment and the third video segment and to determine the type of motion of the video segment resulting from merging as translation.

Figure 11:
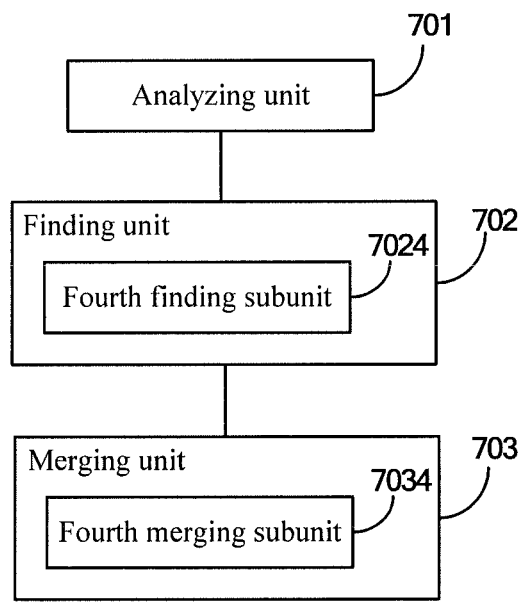
FIG. 11 is a schematic diagram illustrating a ninth apparatus according to an embodiment of the invention.

Further referring to FIG. 11, the finding unit 702 can alternatively include: a fourth finding subunit 7024 configured to find the video segments to be merged under the following condition: for a first video segment, a second video segment and a third video segment which are sequentially neighboring in time, if the type of motion of the first video segment is zooming, the type of motion of the second video segment is translation toward a first direction lasting for a shorter duration than a first preset threshold, and the type of motion of the third video segment is translation toward a second direction different from the first direction lasting for a longer duration than a second preset threshold, then the second video segment and the third video segment meet the preset merging rule.

Correspondingly the merging unit 703 can include: a fourth merging subunit 7034 configured to merge the second video segment and the third video segment and to determine the type of motion of the video segment resulting from merging as translation toward the second direction.

Of course, a practical application will not be limited to the foregoing several specific scenarios, but the merging rule can be set flexibly as required in practice.

With the apparatus according to the embodiment of the invention, the video segments can be merged according to a preset rule in view of the correspondence relationship between the video segments and types of motion determined from analysis. This is equivalent to the case of taking into account unintentional motion introduced by some amateurish photographers during photographing, that is, equivalent to trading off between the fineness of division and the real photographic intention of the user for detecting the camera motion type in a video so that the final result of detection can better accommodate the real situation and also the photographic intention of the user.

Furthermore it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1200 illustrated in FIG. 12, which can perform various functions when various programs are installed thereon.

Figure 12:
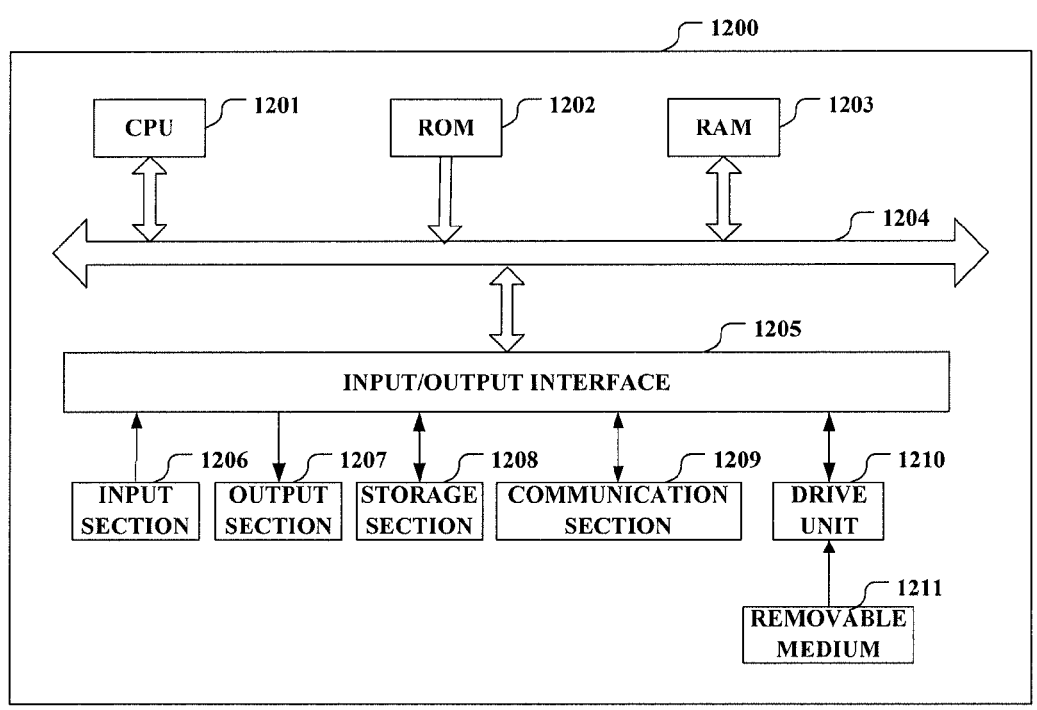
FIG. 12 is a block diagram illustrating an illustrative structure of a personal computer as an information processing device used in an embodiment of the invention.

In FIG. 12, a Central Processing Unit (CPU) 1201 performs various processes according to a program stored in a Read Only Memory (ROM) 1202 or loaded from a storage portion 1208 into a Random Access Memory (RAM) 1203 in which data required when the CPU 1201 performs the various processes is also stored as needed.

The CPU 1201, the ROM 1202 and the RAM 1203 are connected to each other via a bus 1204 to which an input/output interface 1205 is also connected.

The following components are connected to the input/output interface 1205: an input portion 1206 including a keyboard, a mouse, etc.; an output portion 1207 including a display, e.g., a Cathode Ray Tube (CRT), a Liquid Crystal Display (LCD), etc., a speaker, etc.; a storage portion 1208 including a hard disk, etc.; and a communication portion 1209 including a network interface card, e.g., an LAN card, a modem, etc. The communication portion 1209 performs a communication process over a network, e.g., the Internet.

A drive unit 1210 is also connected to the input/output interface 1205 as needed. A removable medium 1211, e.g., a magnetic disk, an optical disk, an magneto optical disk, a semiconductor memory, etc., can be installed on the drive unit 1210 as needed so that a computer program fetched therefrom can be installed into the storage portion 1208 as needed.

In the case that the foregoing series of processes are performed in software, a program constituting the software is installed from a network, e.g., the Internet, etc., or a storage medium, e.g., the removable medium 1211, etc.

Those skilled in the art shall appreciate that such a storage medium will not be limited to the removable medium 1211 illustrated in FIG. 12 in which the program is stored and which is distributed separately from the device to provide a user with the program. Examples of the removable medium 1211 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1202, a hard disk included in the storage portion 1208, etc., in which the program is stored and which is distributed together with the apparatus including the same to the user.

It shall further be noted that the steps of the foregoing series of processes may naturally but not necessarily be performed in the sequential order in time as described. Some of the steps may be performed concurrently or separately from each other.

Although the invention and the advantages thereof have been described in details, it shall be appreciated that various modifications, substitutions and variations can be made without departing from the spirit and scope of the invention as defined by the appended claims. Furthermore the terms "include", "comprise" or any variants thereof in the embodiments of the invention are intended to encompass nonexclusive inclusion so that a process, method, article or apparatus including a series of elements includes both those elements and one or more other elements which are listed explicitly or an element(s) inherent to the process, method, article or device. Without much more limitation, an element being defined by a sentence "include/comprise a(n) . . . " will not exclude presence of an additional identical element(s) in the process, method, article or device including the element.

Regarding the implementations including the above embodiments, the following appendixes are also disclosed:

Appendix 1. A method for camera motion analysis in a video, comprising:
  analyzing, from the video, video segments with significant movement characteristics and video segments without significant movement characteristics;
  as for each video segment without significant movement characteristics, if a first motion type corresponding to a preceding neighboring video segment is different from a second motion type corresponding to a succeeding neighboring video segment, lowering detection criterions of the first motion type and the second motion type;
  judging whether the video segment without significant movement characteristics meet the lowered detection criterions; and
  merging the video segment without significant movement characteristics with neighboring video segments according to the judging result.

Appendix 2. The method according to appendix 1, wherein merging the video segment without significant movement characteristics with neighboring video segments according to the judging result comprises:

if the video segment without significant movement characteristics meets only one of the lowered detection criterions of the first motion type and the second motion type, merging the video segment without significant movement characteristic with a neighboring video segment corresponding to the met one.

Appendix 3. The method according to appendix 1, wherein merging the video segment without significant movement characteristics with neighboring video segments according to the judging result comprises:
  if the video segment without significant movement characteristics meets the lowered detection criterions of both the first motion type and the second motion type, merging the video segment without significant movement characteristic with the neighboring video segments according to extent of meeting.

Appendix 4. The method according to appendix 1, wherein merging the video segment without significant movement characteristics with neighboring video segments according to the judging result comprises:
  if the video segment without significant movement characteristics meets neither the lowered detection criterion of the first motion type nor that of the second motion type, dividing the video segment without significant movement characteristics into two parts; and
  merging the first half part with the preceding neighboring video segment and the second half part with the succeeding neighboring video segment.

Appendix 5. A method for camera motion analysis in a video, comprising:
  analyzing, from the video, video segments contained in the video and camera motion types thereof;
  finding video segments meeting a preset merging rule in the video segments of the video; and
  merging the found video segments and determining the motion type of the merged video segments according to the merging rule.

Appendix 6. The method according to appendix 5, wherein finding video segments meeting a preset merging rule in the video segments of the video comprises:
  finding the video segments meeting the preset merging rule according to neighboring relationship, the motion types and durations of the video segments of the video.

Appendix 7. The method according to appendix 6, wherein finding the video segments meeting the preset merging rule according to neighboring relationship, the motion types and durations of the video segments of the video comprises:
  finding the video segments to be merged according to the following condition: as for a first video segment, a second video segment and a third video segment which are neighboring chronologically, if the motion types of both the first video segment and the third video segment are zooming, the motion type of the second video segment is stillness or translation and the duration thereof is less than a preset threshold, then the first video segment, the second video segment and the third video segment meet the preset merging rule; and
  wherein merging the found video segments and determining the motion type of the merged video segments according to the merging rule comprises:
  merging the first video segment, the second video segment and the third video segment and determining the motion type of the merged video segments as zooming.

Appendix 8. The method according to appendix 6, wherein finding the video segments meeting the preset merging rule according to neighboring relationship, the motion types and durations of the video segments of the video comprises:
  finding the video segments to be merged according to the following condition: as for a first video segment, a second video segment and a third video segment which are neighboring chronologically, if the motion type of the first video segment is zooming, the motion type of the second video segment is translation and the duration thereof is less than a first preset threshold and the motion type of the third video segment is stillness and the duration thereof is greater than a second preset threshold, then the second video segment and the third video segment meet the preset merging rule; and
  wherein merging the found video segments and determining the motion type of the merged video segments according to the merging rule comprises:
  merging the second video segment with the third video segment and determining the motion type of the merged video segments as stillness.

Appendix 9. The method according to appendix 6, wherein finding the video segments meeting the preset merging rule according to neighboring relationship, the motion types and durations of the video segments of the video comprises:
  finding the video segments to be merged according to the following condition: as for a first video segment, a second video segment and a third video segment which are neighboring chronologically, if the motion type of the first video segment is zooming, the motion type of the second video segment is stillness and the duration thereof is less than a first preset threshold and the motion type of the third video segment is translation and the duration thereof is greater than a second preset threshold, then the second video segment and the third video segment meet the preset merging rule; and
  wherein merging the found video segments and determining the motion type of the merged video segments according to the merging rule comprises:
  merging the second video segment with the third video segment and determining the motion type of the merged video segments as translation.

Appendix 10. The method according to appendix 6, wherein finding the video segments meeting the preset merging rule according to neighboring relationship, the motion types and durations of the video segments of the video comprises:
  finding the video segments to be merged according to following conditions: as for a first video segment, a second video segment and a third video segment which are neighboring chronologically, if the motion type of the first video segment is zooming, the motion type of the second video segment is translation in a first direction and the duration thereof is less than a first preset threshold and the motion type of the third video segment is translation in a second direction and the duration thereof is greater than a second preset threshold, wherein the first direction is different from the second direction, then the second video segment and the third video segment meet the preset merging rule; and
  wherein merging the found video segments and determining the motion type of the merged video segments according to the merging rule comprises:
  merging the second video segment with the third video segment and determining the motion type of the merged video segments as translation in the second direction.

Appendix 11. An apparatus for camera motion analysis in a video, comprising:

an analyzing unit, configured to analyze, from the video, video segments with significant movement characteristics and video segments without significant movement characteristics;
a criterion adjusting unit, configured to, as for each video segment without significant movement characteristics, if a first motion type corresponding to a preceding neighboring video segment is different from a second motion type corresponding to a succeeding neighboring video segment, lower detection criterions of the first motion type and the second motion type;
a judging unit, configured to judge whether the video segment without significant movement characteristics meets the lowered detection criterions; and
a merging unit, configured to merge the video segment without significant movement characteristics with neighboring video segments according to the judging result.

Appendix 12. The apparatus according to appendix 11, wherein the merging unit comprises:
a first merging subunit, configured to, if the video segment without significant movement characteristics meets the lowered detection criterion of only one of the motion types, merge the video segment without significant movement characteristic with a neighboring video segment corresponding to the met one.

Appendix 13. The apparatus according to appendix 11, wherein the merging unit comprises:
a second merging subunit, configured to, if the video segment without significant movement characteristics meets the lowered detection criterions of both the first motion type and the second motion type, merge the video segment without significant movement characteristic with neighboring video segments according to extent of meeting.

Appendix 14. The apparatus according to appendix 11, wherein the merging unit comprises:
a dividing subunit, configured to, if the video segment without significant movement characteristics meets neither the lowered detection criterion of the first motion type nor that of the second motion type, divide the video segment without significant movement characteristics into two parts; and
a third merging subunit, configured to, merge the first half part with the preceding neighboring video segment and the second half part with the succeeding neighboring video segment.

Appendix 15. An apparatus for camera motion analysis in a video, comprising:
an analyzing unit, configured to analyze, from the video, video segments contained in the video and camera motion types thereof;
a finding unit, configured to find video segments meeting a preset merging rule in the video segments of the video; and
a merging unit, configured to merge the found video segments and determine the motion type of the merged video segments according to the merging rule.

Appendix 16. The apparatus according to appendix 15, wherein the finding unit is specifically configured to:
find the video segments meeting the preset merging rule according to neighboring relationship, the motion types and durations of the video segments of the video.

Appendix 17. The apparatus according to appendix 16, wherein the finding unit comprises:
a first finding subunit, configured to find the video segments to be merged according to the following condition: as for a first video segment, a second video segment and a third video segment which are neighboring chronologically, if the motion types of both the first video segment and the third video segment are zooming, the motion type of the second video segment is stillness or translation and the duration thereof is less than a preset threshold, then the first video segment, the second video segment and the third video segment meet the preset merging rule; and
wherein the merging unit comprises:
a first merging subunit, configured to merge the first video segment, the second video segment and the third video segment and determine the motion type of the merged video segments as zooming.

Appendix 18. The apparatus according to appendix 16, wherein the finding unit comprises:
a second finding subunit, configured to find the video segments to be merged according to the following condition: as for a first video segment, a second video segment and a third video segment which are neighboring chronologically, if the motion type of the first video segment is zooming, the motion type of the second video segment is translation and the duration thereof is less than a first preset threshold and the motion type of the third video segment is stillness and the duration thereof is greater than a second preset threshold, then the second video segment and the third video segment meet the preset merging rule; and
wherein the merging unit comprises:
a second merging subunit, configured to merge the second video segment with the third video segment and determine the motion type of the merged video segments as stillness.

Appendix 19. The apparatus according to appendix 16, wherein the finding unit comprises:
a third finding subunit, configured to find the video segments to be merged according to the following condition: as for a first video segment, a second video segment and a third video segment which are neighboring chronologically, if the motion type of the first video segment is zooming, the motion type of the second video segment is stillness and the duration thereof is less than a first preset threshold and the motion type of the third video segment is translation and the duration thereof is greater than a second preset threshold, then the second video segment and the third video segment meet the preset merging rule; and
wherein the merging unit comprises:
a third merging subunit, configured to merge the second video segment with the third video segment and determine the motion type of the merged video segments as translation.

Appendix 20. The apparatus according to appendix 16, wherein the finding unit comprises:
a fourth finding subunit, configured to find the video segments to be merged according to the following condition: as for a first video segment, a second video segment and a third video segment which are neighboring chronologically, if the motion type of the first video segment is zooming, the motion type of the second video segment is translation in a first direction and the duration thereof is less than a first preset threshold and the motion type of the third video segment is translation in a second direction and the duration thereof is greater than a second preset threshold, wherein the first direction is different from the second direction, then the second video segment and the third video segment meet the preset merging rule; and wherein the merging unit comprises:

a fourth merging subunit, configured to merge the second video segment with the third video segment and determine the motion type of the merged video segments as translation in the second direction.

The invention claimed is:

1. A method for camera motion analysis in a video, comprising:

analyzing, from the video, video segments with significant movement characteristics and video segments without significant movement characteristics;

lowering, for each video segment without significant movement characteristics, detection criterions of a first motion type and a second motion type when the first motion type corresponding to a preceding neighboring video segment is different from the second motion type corresponding to a succeeding neighboring video segment;

judging whether the video segment without significant movement characteristics meet the lowered detection criterions; and merging the video segment without significant movement characteristics with one or more neighboring video segments according to a result of the judging.

2. The method according to claim 1, wherein the merging comprising:

merging the video segment without significant movement characteristic with the one or more neighboring video segments when the video segment without significant movement characteristics meets only one of the lowered detection criterions of the first motion type and the second motion type.

3. The method according to claim 1, wherein the merging comprising:

selecting a method of merging the video segment without significant movement characteristic with the one or more neighboring video segments based on an extent to which the video segment without significant movement characteristics meets the lowered detection criterions of both the first motion type and the second motion type.

4. The method according to claim 1, wherein the merging comprising:

dividing the video segment without significant movement characteristics into two parts when the video segment without significant movement characteristics meets neither the lowered detection criterion of the first motion type nor that of the second motion type; and merging a first part with the preceding neighboring video segment and a second part with the succeeding neighboring video segment.

5. An apparatus for camera motion analysis in a video, comprising:

an analyzing unit, configured to analyze, from the video, video segments with significant movement characteristics and video segments without significant movement characteristics;

a criterion adjusting unit, configured to lower, for each video segment without significant movement characteristics, detection criterions of a first motion type and a second motion type, when the first motion type corresponding to a preceding neighboring video segment is different from the second motion type corresponding to a succeeding neighboring video segment;

a judging unit, configured to judge whether the video segment without significant movement characteristics meets the lowered detection criterions; and a merging unit, configured to merge the video segment without significant movement characteristics with one or more neighboring video segments according to a result of the judging.

6. The apparatus according to claim 5, wherein the merging unit comprises:

a first merging subunit, configured to, merge the video segment without significant movement characteristic with the one or more neighboring video segments when the video segment without significant movement characteristics meets a lowered detection criterion of only one of the first motion type and the second motion type.

7. The apparatus according to claim 5, wherein the merging unit comprises:

a second merging subunit, configured to select a method of merging the video segment without significant movement characteristic with the one or more neighboring video segments based on an extent to which the video segment without significant movement characteristics meets the lowered detection criterions of both the first motion type and the second motion type.

8. The apparatus according to claim 5, wherein the merging unit comprises:

a dividing subunit, configured to divide the video segment without significant movement characteristics into two parts when the video segment without significant movement characteristics meets neither the lowered detection criterion of the first motion type nor that of the second motion type; and a third merging subunit, configured to, merge a first part with the preceding neighboring video segment and a second part with the succeeding neighboring video segment.

* * * * *